Feb. 14, 1961 D. R. KNOX 2,971,554
SHAPING OF ENDS OF HOLLOW WORK PIECES
Filed Feb. 8, 1954 3 Sheets-Sheet 1
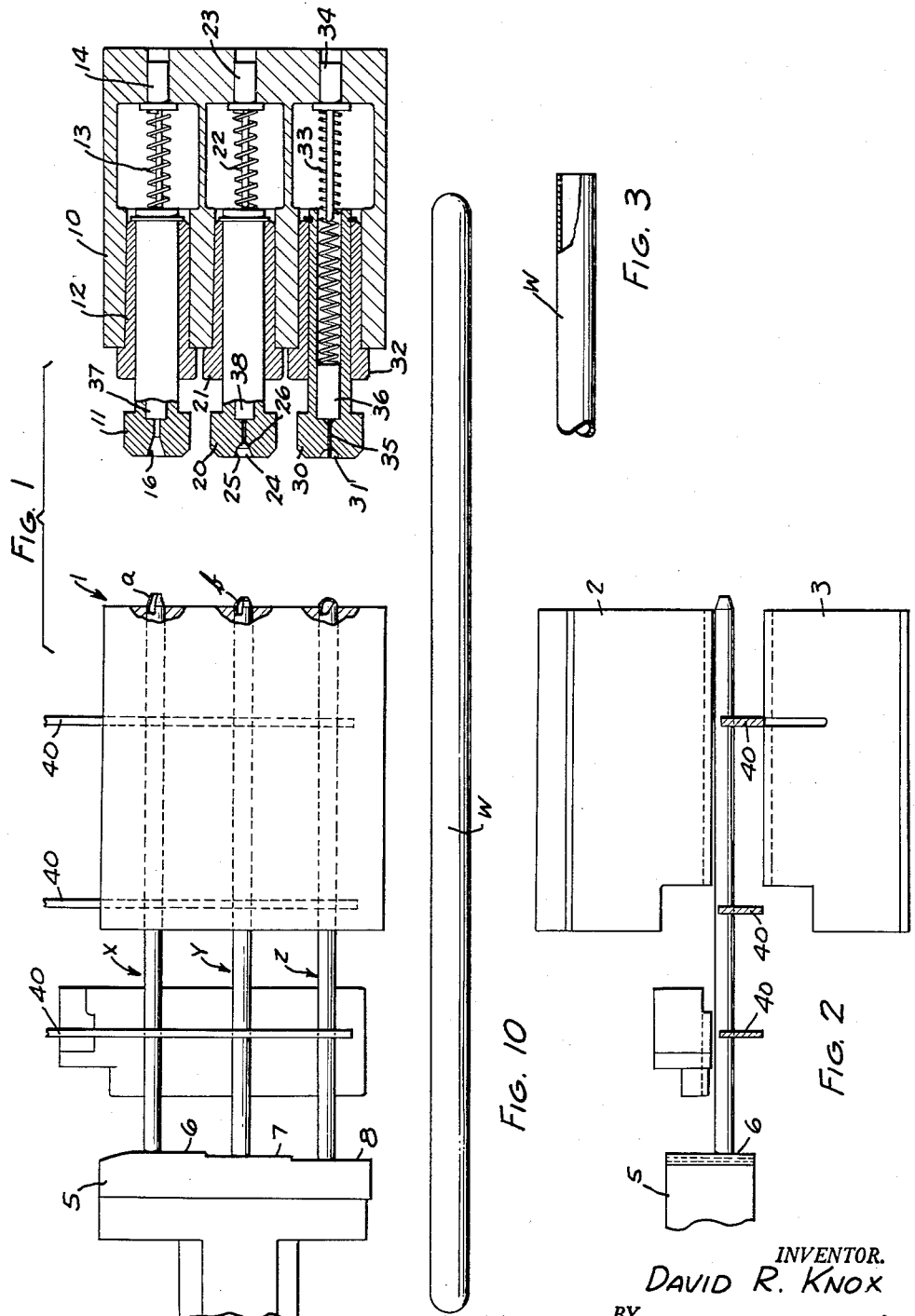
INVENTOR.
DAVID R. KNOX
BY
Barnes, Kisselle, Laughlin & Raisch
ATTORNEYS Feb. 14, 1961 D. R. KNOX 2,971,554
SHAPING OF ENDS OF HOLLOW WORK PIECES
Filed Feb. 8, 1954 3 Sheets-Sheet 2
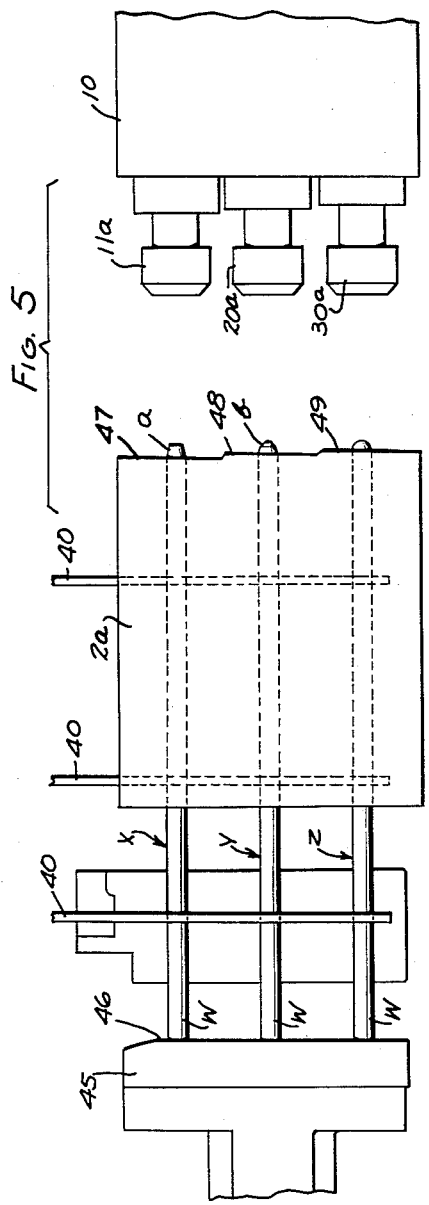
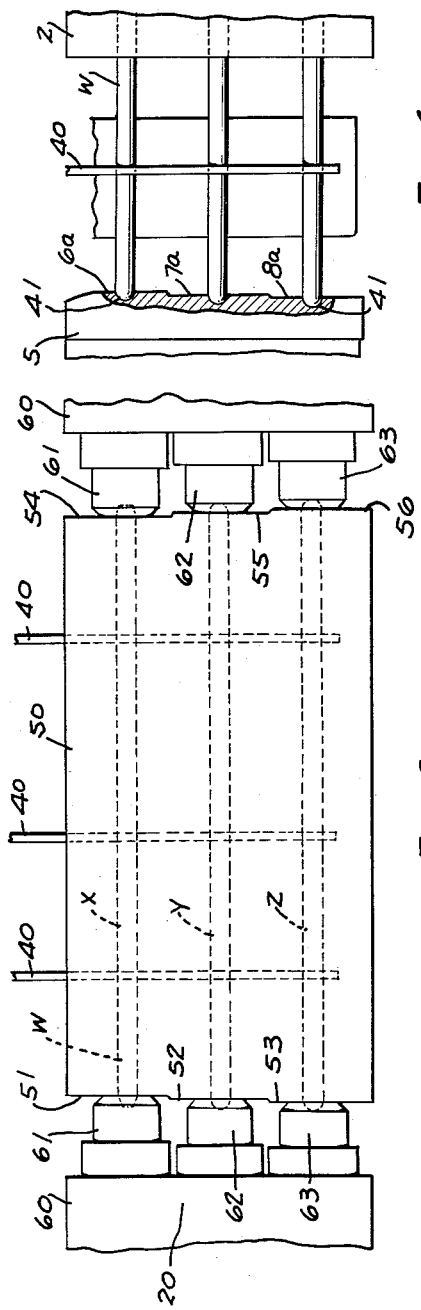
INVENTOR.
DAVID R. KNOX
BY
ATTORNEYS Feb. 14, 1961 D. R. KNOX 2,971,554
SHAPING OF ENDS OF HOLLOW WORK PIECES
Filed Feb. 8, 1954 3 Sheets-Sheet 3

INVENTOR.
DAVID R. KNOX
BY
*Barnes, Kisselle, Laughlin & Raisch*
ATTORNEYS.

United States Patent Office 2,971,554
Patented Feb. 14, 1961

2,971,554

SHAPING OF ENDS OF HOLLOW WORK PIECES

David R. Knox, Huntington Woods, Mich., assignor to Bundy Tubing Company, Detroit, Mich., a corporation of Michigan Filed Feb. 8, 1954, Ser. No. 408,828

13 Claims. (Cl. 153—2)

This invention relates to the shaping of ends of hollow work pieces such as tubing or pipe.

More particularly the invention is concerned with the shaping of ends of hollow work pieces by means of a type of die operation, wherein the end of a work piece is subjected to one or more impacts or blows of one or more instruments or tools delivered in a direction axially of the work piece. The end of the work piece may be formed substantially in accordance with the shape or one or more of the instruments. The invention is particularly adaptable for cold forming hollow metal work pieces.

When a work piece, such as a length of steel tubing, is subjected on its end to an impact or blow, the tendency is to upset the metal of the wall of the tube inwardly from its end. Whether or not an upset takes place, depends on various factors including the force with which the blow is delivered, the thickness of the tube wall, etc., but usually an upset is encountered. The upset appears as an enlargement or a bulge in the tube wall thus destroying uniform outside diameter of the work piece and changing the overall length of the work piece because of the metal consumed in the upset. Accordingly, such upsetting cannot be countenanced where it is desirable or necessary to maintain, within close limits, the outside diameter and overall length of the work piece. One type of work piece with which the invention is useful is tubular rod with semi-spherical ends for operating valves of engines. These are commonly called push rods. A new push rod structure is produced, and the method and apparatus is disclosed with reference to the making of a push rod.

The term "tube" or the term "tubing" is sometimes applied to small diameter products while the term "pipe" is sometimes applied to products of larger diameter. For convenience and brevity the term "tube" or the term "tubing" will be used herein, but having in mind that the invention may be used with work pieces of varying diameter and with various work pieces of hollow form, these terms are not used as delimitations.

One form of apparatus is shown in the accompanying drawings for carrying out the invention.

Fig. 1 is a view partly in side elevation and partly in section illustrating apparatus for performing the invention and showing work pieces in position therein.

Fig. 2 is a top view illustrating the clamp in open position.

Fig. 3 is a view illustrating the end of a work piece before it is operated upon.

Fig. 4 is a partial view similar to Fig. 1 showing the arrangement for forming the opposite ends of the work pieces.

Fig. 5 is a view of a modified form of structure.

Fig. 6 is a view similar to Fig. 1 illustrating a modified form for simultaneously shaping of opposite ends of work pieces.

Fig. 10 is a view showing the finished product in the form of a push rod.

Figure 7:
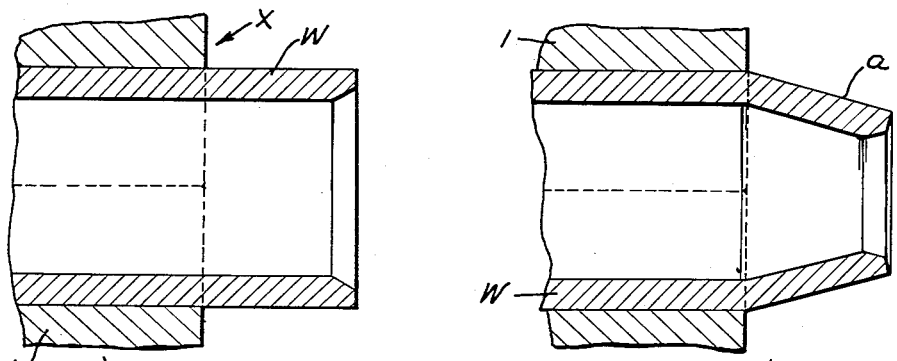
Fig. 7 is a view illustrating the work piece in position $x$ and showing the work piece both before and after the forming operation performed in position $x$.

In accordance with this invention a push rod with shaped ends may be made from a tubular work piece W as shown in Fig. 3 which is accurately cut to length with its ends treated so that it is free of burrs. This work piece may be butt welded tube in that it may be fashioned from strip metal stock, such as steel, fashioned into tubular form with its edges abutting and with the edges welded together.

Preferably, the forming of the end of the work piece is accomplished by a plurality of forming operations. To this end there is shown in Fig. 1 and 2 a clamping structure generally illustrated at 1 comprised of separable parts which have matching grooves for receiving the work piece. The part 2 may be relatively stationary, while the mating part 3 is the movable one. Fig. 2 illustrates the parts separated. These two clamping parts, which also have a die function as will later appear, having matching grooves for receiving three work pieces.

As shown in Fig. 1, there is what may be termed a stop 5 provided with three faces or lands against which the work pieces abut. The lands are in different planes. The land for the first operation on the work piece is illustrated at 6, the land for the second operation is shown at 7 and the land for the third operation is shown at 8.

A movable forming assembly, in the structure shown in Fig. 1, has three forming tools which may be termed "punches" but which in reality have a die function. There is a carrier 10 which has a first tool or instrument 11 therein slidably mounted in a sleeve 12 and backed up by a spring 13 held by a holder 14. This tool is provided with a cavity 16 having a tapered formation as shown. There is a second tool 20 similarly slidably mounted in a sleeve 21 and backed up by a spring 22 held by its spring guide 23. This tool also has a cavity 24 and the wall 25 thereof may be at a more abrupt angle than the cavity 16 and indeed the cavity 24 may be shaped so that its internal walls are at different angles one portion being at 25 and the other at 26.

There is a third tool 30 with the hemispherical cavity 31. This tool is slidably mounted in the sleeve 32 backed up by a spring 33 with its holder 34. The tool 30 has a pilot 35 projecting into the cavity 31 and this pilot is carried by an insert 36 against which the spring 33 acts. For convenience in making the several tools, they may all be made somewhat similar, and the tools 11 and 20 provided with dummy inserts 37 and 38 although tools 11 and 20 have no pilots.

The work pieces progress through the machine and in the first position $x$ it is backed up by the land 6; then it is shifted to the second position, indicated at $y$, where it is backed up by the land 7; then it is shifted to the third position, indicated at $z$, where it is backed up by the land 8. There will, of course, be three work pieces which are operated on at the same time and between operations the clamp members open, as shown in Fig. 2, and feeding or transfer means with feeding fingers 40 operate to move the work piece from one position to another and in so doing introduce a fresh work piece into the first position $x$ and remove the work piece from third position $z$. Such transfer or feeding means is known to those versed in the punch and die art.

The forming tools in the carrier 10 are advanced by movement of the carrier and the first tool 11 strikes the work piece in position x and fashions the end thereof inwardly to give it a sort of frusto-conical shape, as shown at a. In this action, the tool 11 retracts against the action of the spring 13 and bottoms against its sleeve 12 so that the axial impact is delivered to the tube to shape the end as shown. The clamping elements in the structure shown in Fig. 1 clamp the work pieces with sufficient tightness to resist much of the axial forces so that the exposed portions of the work pieces between the clamping elements and the stop 5 are not subjected to compression such as might cause these parts to bend or bow.

Figure 8:
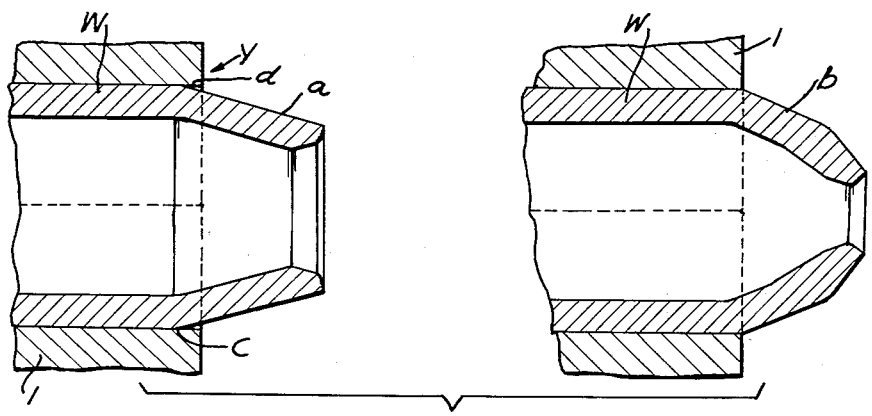
Fig. 8 is a view similar to Fig. 7 showing the work piece in position $y$ and illustrating the work piece both before and after the forming operation is performed in position $y$.

The thusly formed work piece is now transferred to the second position at y, this being done when the clamp is open and the carrier 10 retracted. In the next stroke the tool 20 fashions the end of the work piece as shown at b, the shape thereof being approximately the same as that of the recess 24. As the forming tool advances, the work piece is pushed back against the land 7 with yielding of the spring 22 and then when the work piece is thus positioned the clamps tightly engage the tube. This is also true of the work pieces in positions x and z. When the impact of the second tool is delivered the forces thereof tend to upset the metal of the tube outwardly. This tendency is to upset the metal substantially at the line of intersection between the normal tube wall and the formed angular end at the location c (Fig. 8). In other words, the tendency is to upset the metal at the base of the frusto-conical shape. This tendency is increased because the metal more near the apex of the frusto-cone has been more cold worked than the metal at the base. However, the metal in the vicinity of the location c is now confined within the clamp and there is a slight die clearance d around the base part of the frusto-conical shape. Accordingly, when this metal is upset it can only upset to the extent of the defining walls at d. It will be seen therefore that the clamp serves a die function.

Figure 9:
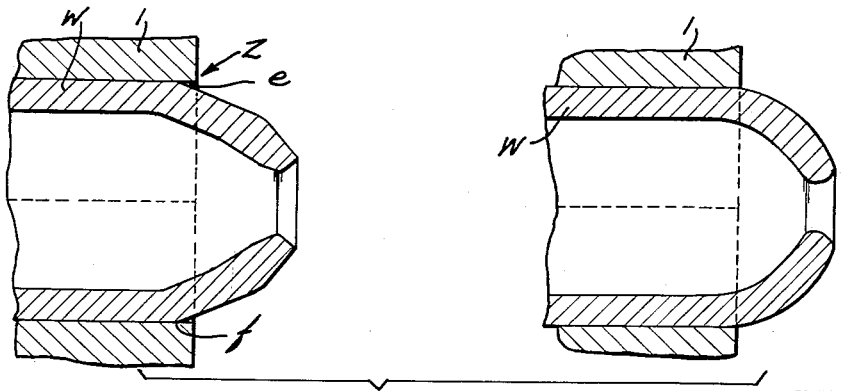
Fig. 9 is a view similar to Fig. 8 showing the work piece in position $z$ and illustrating the work piece both before and after the forming operation is performed in position $z$.

The carrier now retracts, the clamps 2 and 3 open, and the work piece moved to position as indicated at z (Fig. 9). Here again, as shown in Fig. 9, the work piece will be pushed back against the land 8 leaving the die clearance e so that when the tool 30 shapes the end of the work piece into semi-spherical form, the metal in the vicinity of the zone f will expand or upset only to the extent permitted by the clamping elements. Thus the end of the work piece may be fashioned into semi-spherical shape with the outside diameter maintained within necessary close tolerances and the overall length maintained. The pilot 35 enters the tubing and defines an opening centrally positioned in the semi-spherical head.

The opposite ends of the work pieces may now be similarly formed by apparatus like that just described and as shown in Fig. 4. The same reference characters are applied to like parts and the only difference is that the lands 6a, 7a and 8a are recessed as at 41 for accommodating the formed ends.

In the modified form of Fig. 5, the stop 45 has a stopping face 46 in one plane, but the clamp structure, as shown at 2a, has faces 47, 48 and 49 at three different parallel planes. The forming tools may retract to three different levels as shown. Thus, instead of shifting the work pieces relative to the clamp, the faces of the clamp vary and the position of the forming tools 11a, 20a and 30a vary. The parts shown in Fig. 5 are otherwise the same and have the same reference characters applied.

In the form shown in Fig. 6, both ends of the work pieces may be simultaneously shaped. In this form the clamp structure 50 engages the work pieces leaving their ends exposed and the faces of the clamp structure 50 are disposed in three planes as at 51, 52 and 53 on one side, and at 54, 55 and 56 on the opposite side. The forming tools on each side may be respectively identical with each other and carried by movable members 60, the forming tools for the first operation being illustrated at 61, for the second operation 62 and for the third operation at 63. In this form the clamp 50 grips the work pieces with sufficient tightness to hold them against bending or bowing since the forming tools provide reaction one for the other. Since the position of the work pieces do not change axially the several forming tools are stepped relative to each other at different levels as shown. In this case the forming tools are rigidly mounted on their carriers 60 as no springs are needed.

It will be observed that by forming the end of a push rod in this manner, which is a form of die operation, that the metal at the formed end is thickened. This will be appreciated by a consideration of Figs. 7, 8 and 9. In the first forming operation, as shown in Fig. 7, there is hardly any appreciable thickening of the metal. In the second operation, as shown in Fig. 8, the inwardly formed metal shows some thickening of the wall section and, as will be seen from Fig. 9, the completely formed end has a rather substantially thickened wall. The thickened metal merges into the tubing wall near the juncture of the normal tubing wall and the rounded end portion. This strengthens the end construction. It will be appreciated that in use the impact load on the push rod is delivered to and through the ends thereof since each end of a push rod is functioning in a socket. Moreover, the thickened wall section increases the wearing capacity where the rounded ends engage in the sockets in the operating and operated devices, such as the tappet and rocker arms.

A finished push rod for engine valves is indicated at W1 (Fig. 10). In use, the rounded ends are disposed in socket formations of operating mechanism and the rod transmits thrust. It will be seen how the push rod may be quickly and accurately formed and given semi-spherical heads for operation in sockets, and how the outside diameter and overall length are maintained within close tolerances necessary in operating parts of this kind. Before being used it may be desirable or necessary to harden the metal, particularly the ends which operate in sockets. The hollow push rod with the holes at the ends may serve to transmit lubricating oil when in use. While the invention has been disclosed in conjunction with the making of a tubular push rod for engines, and reference is made to internal combustion engines, the invention may be employed for shaping the end portion of any sort of tubular work piece for any purpose. Moreover, the work piece need not be tubular throughout its whole extent but may only have a tubular end. Further the invention may be employed in shaping the ends of tubular work pieces into forms other than truly semi-spherical and particularly into generally rounded forms such, for example, as parabolic.

I claim:

1. The method of shaping an end portion of a metal tubular work piece which comprises, shaping said end portion into inward generally tapering constricted form, positioning the work piece in a die opening with a part of the constricted form adjacent the normal tube wall positioned within the die opening, and with a part projecting from the die opening, striking said projecting end portion with a shaping tool which delivers an impact to the work piece axially thereof to further generally taperingly constrict said projecting portion and to cause the metal of said constricted portion which lies within the die opening to upset outwardly against the walls of the die opening, again placing the work piece in a die opening with a part of the constricted metal within the die opening and with a part projecting therefrom, and again striking said projecting part with a forming tool to further shape said projecting portion inwardly and cause the metal of the constricted portion within the die opening to upset outwardly against the walls of the opening whereby to maintain the outside diameter of the work piece.

2. The method of shaping an end portion of a metal tubular work piece which comprises, shaping said end portion into inward generally tapering constricted form, positioning the work piece in a die opening with a part of the constricted form adjacent the normal tube wall positioned within the die opening, and with a part projecting from the die opening, striking said projecting end portion with a shaping tool which delivers an impact to the work piece axially thereof to further generally taperingly constrict said projecting portion inwardly and to cause the metal of the constricted portion which lies within the die opening to upset outwardly against the walls of the die opening, again placing the work piece in a die opening with a part of the constricted metal within the die opening and with a part projecting therefrom, and again striking said projecting part with a forming tool having a rounded forming cavity to further shape the projecting portion inwardly into rounded form and cause the metal of the constricted portion within the die opening to upset outwardly against the walls of the opening whereby to maintain the outside diameter of the work piece.

3. The method of shaping an end portion of a metal tubular work piece which comprises, disposing the work piece in a confining opening a plurality of instances, i.e. a first instance and at least one subsequent instance with said end of the work piece projecting therefrom, striking said projecting end of the work piece in the first instance with a forming tool which delivers an impact to the work piece axially thereof to generally taperingly inwardly constrict said projecting end, positioning the work piece subsequently with a part of the constricted shape disposed within a confining opening, striking said projecting end portion subsequently with a forming tool which delivers an impact to the work piece axially thereof to further shape said end portion inwardly and cause the metal of the constricted part which lies within the opening to upset outwardly, whereby the outward upset is limited by the walls of the confining opening.

4. The method of shaping an end portion of a metal tubular work piece which comprises, disposing the work piece in successive positions a plurality of times in openings in die-like elements with said end of the work piece projecting therefrom, striking said projecting end of the work piece in each position with a shaping tool which delivers an impact to the work piece axially thereof to successively generally taperingly constrict and finally shape said end portion, and locating the work piece in each position subsequent to the first position so that a part of the previously shaped constricted form thereof lies within the die opening, the axial impact in each position subsequent to the first position causing the metal of the constricted part which lies within the die opening to upset outwardly against the walls of the die opening.

5. An apparatus for shaping the end portion of tubular work pieces comprising, die-like means for engaging and holding a work piece, a plurality of shaping tools for successively striking an end of the work piece to generally taperingly constrict and finally shape said end, means for positioning the work piece relative to the die-like means by engagement with the opposite end of the work piece so that the first named end of the work piece projects from the die-like means to be acted upon by the shaping tools, the face of the die-like means and the positioning means being so related that the work piece is located in successively retracted positions relative to the die-like means to be acted upon by the respective shaping tool, the die-like means in a succeeding position having a portion enclosing a part of the constricted portion of the work piece formed at a preceding position, said portion of said die-like means being effective to contain upset of the work piece incident to operation of a tool thereon at said succeeding position.

6. An apparatus for shaping the end portion of tubular work pieces comprising, die-like means having a plurality of die-like openings for receiving a work piece and holding it successively in different positions, a plurality of forming tools each for striking an end portion of the work piece in the respective positions to generally taperingly constrict and finally shape said end, means for positioning the work piece relative to the die-like means by engagement with the opposite end of the work piece so that the first named end of the work piece projects from the die-like means to be acted upon by the shaping tools, the face of the die-like means and the positioning means being so related that the work piece is located in successively retracted positions in the successive die openings, each succeeding die opening having a portion forming a container for a part of the constricted portion formed at a preceding die opening, said container being effective to contain upset of the work piece incident to operation of a tool on the work piece at the succeeding die opening.

7. An apparatus for shaping the end portion of tubular work pieces comprising, die-like means having a plurality of die-like openings for receiving a work piece and holding it successively in different positions, a plurality of forming tools each for striking an end portion of the work piece in the respective positions to generally taperingly constrict and finally shape said end, and stop means for engaging the opposite end of the work piece and having stop faces at different levels so that the work piece in its several positions is successively retracted into the die-like means, the die-like means in a succeeding position having a portion enclosing a part of the constricted portion of the work piece formed at a preceding position, said portion of said die-like means being effective to contain upset of the work piece incident to operation of a tool thereon at said succeeding position.

8. An apparatus for shaping the end portion of tubular work pieces comprising, die-like means having a plurality of die-like openings for receiving a work piece and holding it successively in different positions, a plurality of forming tools each for striking an end portion of the work piece in the respective positions to generally taperingly constrict and finally shape said end, stop means for locating the work piece in each of the several positions, the die-like means having faces surrounding each die-like opening disposed in different planes each succeeding die-like opening having a portion forming a container for a part of the constricted portion formed at a preceding die-like opening, said container being effective to contain upset of the work piece incident to operation of a tool on the work piece at the succeeding die opening.

9. An apparatus for shaping the end portion of tubular work pieces comprising, die-like means having a plurality of die-like openings for receiving a work piece and holding it successively in different positions, with its opposite ends projecting therefrom, means operable to position the work piece successively in said die-like openings, a plurality of forming tools arranged adjacent the opposite ends of the work piece and each for striking an end of the work piece to generally taperingly constrict and finally shape the same, the opposite sides of the die-like means having face portions surrounding the die openings disposed in different planes, each succeeding die-like opening having adjacent its respective face portion a portion forming a container positioned to receive a part of the constriction formed at a preceding die-like opening, said container being effective to contain upset of the work piece incident to operation of a tool thereon at said succeeding die-like opening, and the shaping tools on each side of the die-like means being positioned in different planes substantially corresponding to the different planes of the faces of the die-like means.

10. An apparatus for shaping the end portion of tubular work pieces comprising, holding means for engaging and holding a work piece, said holding means including a die-like portion which encloses a portion of the work piece, a plurality of shaping tools for successively striking an end of the work piece to generally taperingly constrict and finally shape said end, positioning means mounted for movement relative to said holding means and operative to position the work piece at successive positions relative to said holding means with the end of the work piece projecting from the die-like portion for being acted upon successively by the shaping tools, said positioning means and holding means cooperating upon movement of the work piece from one position to a succeeding position to change the relative placement of the die-like portion and the projecting end of the work piece, said die-like portion in the succeeding position enclosing a part of the previously formed constricted portion of the workpiece for containing upset thereof incident to impact thereon by a tool at said succeeding position, and means for actuating a shaping tool to strike the projecting end portion of the work piece in said succeeding position.

11. The method of shaping an end portion of a metal tubular work piece which comprises, shaping said end portion so that it tapers generally into a form having a cross dimension less than that of the normal tubular wall, positioning the work piece in a die opening with the juncture of the tube wall and said tapered end positioned within the die opening and with the tapered end projecting from the die opening, thus providing clearance between the tapered portion and the surrounding wall of the die opening, and while supporting the work piece within the die opening against axial force applied thereto, striking said end portion of the work piece with an impact directed rectilinearly axially of the work piece to apply further shaping force to said end portion, controlling said shaping force to further shape inwardly said end portion, and containing within said surrounding wall of the die opening the resulting outward upset of the metal of said shaped end portion which lies within the die opening.

12. The method of shaping an end portion of a metal tubular work piece which comprises, shaping said end portion into a generally taperingly inwardly constricted form, positioning the work piece in a die opening with a part of said constricted form positioned within the die opening, thus providing clearance between said part of said constricted form and the surrounding wall of the die opening, and with said end portion projecting from the die opening, striking said projecting end portion with a shaping tool which delivers an impact to the work piece rectilinearly axially thereof to apply further shaping force to said end portion, controlling said shaping force to further shape inwardly said end portion and to cause the metal of the relatively constricted portion which lies within the die opening to upset outwardly, whereby the outward upset is limited by said surrounding wall of the die opening.

13. The method of shaping an end portion of a tubular work piece which comprises, providing a tubular work piece having a generally tapered end portion adjoining the normal tube wall, positioning a portion of the work piece including the juncture of the normal tube wall and the tapered portion in a die opening with the tapered portion projecting out of the die opening, thus providing clearance between said tapered portion and the surrounding wall of the die opening, subjecting the work piece to a rectilinear axial impact in such a manner as to apply shaping force to said projecting portion, controlling said shaping force to further shape inwardly said projecting portion with an accompanying upset of the metal of the tapered portion within the die opening against said surrounding wall of the die opening.

References Cited in the file of this patent

UNITED STATES PATENTS

| | | |
|---|---|---|
| 430,539 | Parmellee | June 17, 1890 |
| 529,597 | Cayley et al. | Nov. 20, 1894 |
| 1,393,916 | Smith | Oct. 18, 1921 |
| 1,538,610 | Bast | May 19, 1925 |
| 1,566,645 | Breeze | Dec. 22, 1925 |
| 1,605,494 | Anderson | Nov. 2, 1926 |
| 1,800,526 | Higgens et al. | Apr. 14, 1931 |
| 2,027,406 | Spatta | Jan. 14, 1936 |
| 2,176,188 | Poole et al. | Oct. 17, 1939 |
| 2,263,059 | Werme | Nov. 18, 1941 |
| 2,357,110 | Heinemann | Aug. 29, 1944 |
| 2,513,739 | O'Neil | July 4, 1950 |
| 2,515,841 | Stuart | July 18, 1950 |
| 2,569,523 | Hahn et al. | Oct. 2, 1951 |
| 2,851,980 | Kraicinski | Sept. 16, 1958 |